United States Patent Office 3,179,457
Patented Apr. 20, 1965

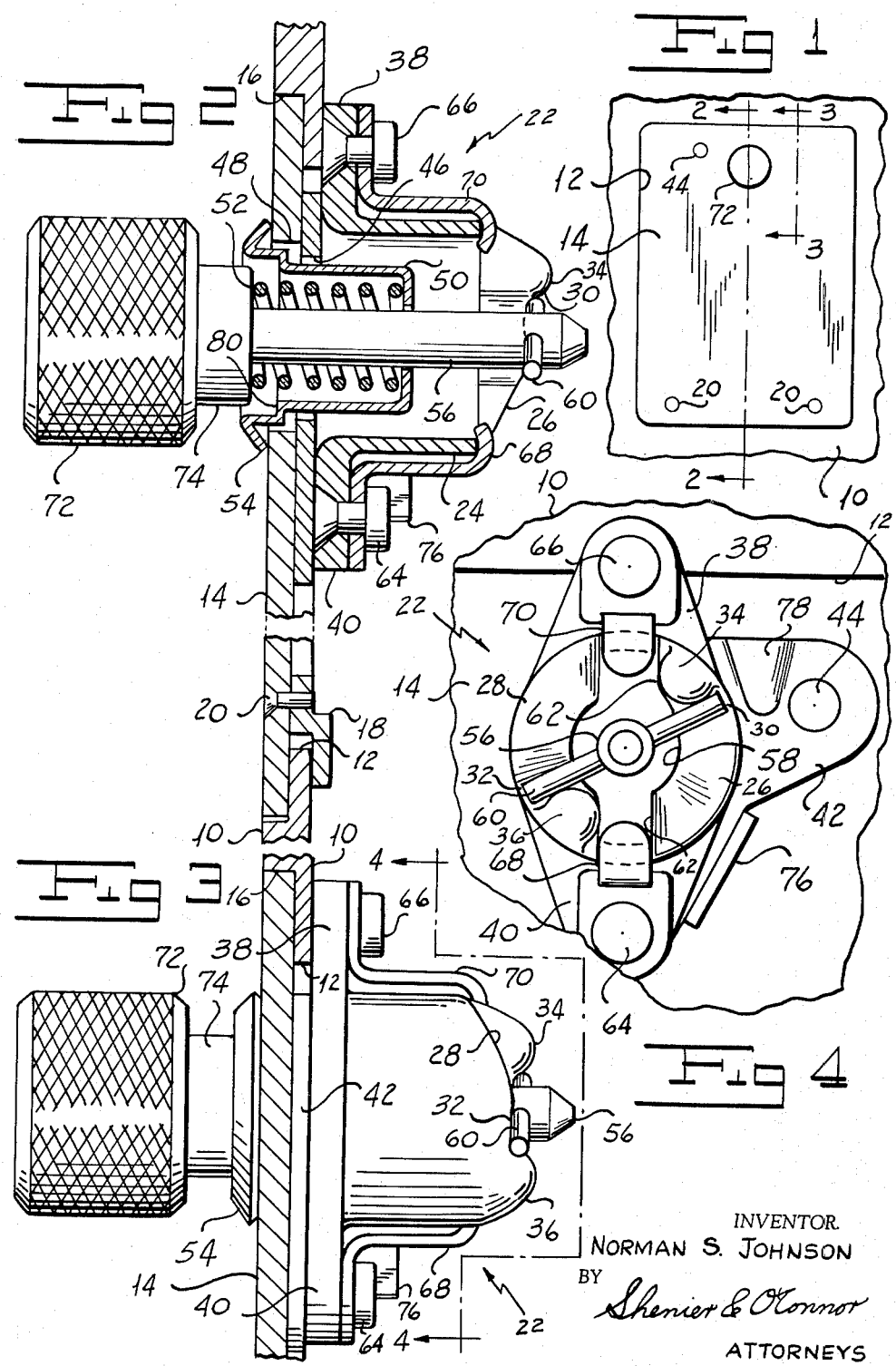

3,179,457
READILY RELEASABLE FASTENER
Norman S. Johnson, New Milford, N.J., assignor to Camloc Fastener Corporation, Paramus, N.J., a corporation of New York
Filed Feb. 5, 1962, Ser. No. 171,085
3 Claims. (Cl. 292—195)

My invention relates to a rotary fastener, and more particularly to an improved fastener for securely holding two members together which can be readily released.

In many instances, as in the case of high-speed aircraft, it is necessary that access openings be provided in the skin of the aircraft. In normal operation of the aircraft, it is required that these openings be securely closed. In order that the skin of the aircraft have a substantially smooth surface the fastener latch should be inside the craft. Of necessity it must be actuatable from outside the craft. In order to accomplish this object in the prior art, tightenable rotary fasteners adapted to be actuated from outside the craft are used to hold doors in place over the openings.

Most of the devices of the prior art for holding doors in positions at which they close access openings include a latch which engages the inside of the aircraft body in which the opening is provided. It has been found that an ordinary latch which merely rotates from a released position to a latching position does not hold the door in the opening with sufficient force to be satisfactory. For this reason, it has been suggested in the prior art that the latch be provided with a screw which permits the latch to be drawn into firm engagement with the body of the aircraft when in latching position. These latches of the prior art embody a number of disadvantages. First, it is necessary that some means be provided on the outside of the aircraft or the like for indicating when the latch is in its latching position. If this is not done, the screw may be tightened when the latch is not in its correct latching position so that the latch fails to accomplish its intended purpose of holding the door in place over the opening. It is possibe also in use of these latches of the prior art to tighten the screw to a point at which release of the latch becomes extremely difficult. Not only is this true, but even where the screws are not tightened excessively, the operation of securing the door in the opening by use of the latch is a relatively tedious, inconvenient and time-consuming operation.

I have invented a readily releasable fastener which overcomes the defects of fasteners of the prior art pointed out above. My fastener holds the latch tightly in engagement with the portion of the body surrounding the opening while at the same time being readily releasable. My fastener holds the latch in engagement with the body having the opening with a predetermined force. My fastener may be engaged and released by a simple and easily performed operation. It does not require that an external indicator be provided to show that the latch is in latching position.

One object of my invention is to provide a readily releasable fastener for holding a door firmly in position over an access opening.

Another object of my invention is to provide a readily releasable fastener which overcomes the defects of fasteners of the prior art.

A further object of my invention is to provide a readily releasable fastener which may be moved to latching position or to released position in a simple and expeditiously performed operation.

A still further object of my invention is to provide a readily releasable fastener which cannot be excessively tightened.

Still another object of my invention is to provide a readily releasable fastener which requires no external indicator to show that the latch is in latching position.

Other and further objects of my invention will appear from the following description:

In general, my invention contemplates the provision of a readily releasable fastener for securing a door in an access opening in which an actuator shaft is rotated to move the fastener latch from a released position to a latching position at which the latch engages a stop. In response to a further rotation of the shaft relative to the latch the shaft moves axially against the action of a spring and snaps into a locked position at which the spring draws the latch into engagement with the material around the opening. To release the latch the shaft is rotated in the opposite direction while the latch is momentarily restrained against rotation so that the shaft is first released and upon further rotation of the shaft, the latch is moved to its released position at which the door can be swung out of the opening.

In the accompanying drawings which form part of the instant specification and which are to be read in conjunction therewith and in which like reference numerals are used to indicate like parts in the various views.

FIGURE 1 is a front elevation of an access opening and its associated door with which my readily releasable fastener is used.

FIGURE 2 is a sectional view of the opening and door having my readily releasable fastener shown in FIGURE 1 taken along the line 2—2 of FIGURE 1 and drawn on a scale.

FIGURE 3 is a side elevation of my readily releasable fastener.

FIGURE 4 is a fragmentary plan view of my readily releasable fastener.

Referring now to the drawings, a frame or body 10 of an aircraft or the like is provided with an access opening 12 which is adapted to be closed by a door 14. This door 14 fits into a rabbet 16 formed in the frame 10 around the opening. I secure a keeper flange 18 to the door 14 adjacent the bottom thereof by any suitable means such for example, as rivets 20. When the door 14 is placed over the opening 12, keeper 18 slides over the lower edge of the opening, thus to provide a connection between the door and the opening. It will readily be apparent that I could, if desired, replace the keeper flange 18 by a hinge or any other suitable connection. In one particular application of my readily releasable fastener, the door 14 may, for example, close an aircraft access opening having dimensions of four inches by six inches. In such an installation the periphery of the door 14 closely fits the recess 16 to afford a smooth outer surface of the craft with no appreciable interruptions.

My readily releasable fastener indicated generally by the reference character 22, includes a shell or body having a base 24 and respective cam surfaces 26 and 28 extending upwardly from the top of the base toward respective crosspin receiving notches 30 and 32. I provide respective stops 34 and 36 on the sides of the notches 30 and 32 remote from cam surfaces 26 and 28. I form the base 24 with a latch 38 and with a stop-engaging arm 40 extending from the base 24 in a direction generally opposite to that in which the latch 38 extends.

I mount a stop plate 42 on the inside of door 14 by any suitable means such as a rivet 44 in a position at which an opening 46 in the plate registers with an opening 48 in the door. The registering openings 46 and 48 receive a generally cylindrical spring housing 50 in which I dispose a coil spring 52. I provide the outer end of the housing 50 with a peripheral flange 54 adapted to engage the area of the door 14 surrounding opening 48.

The actuator shaft 56 of my fastener extends through the housing 50 and through a central opening 58 in base 24 between cam surfaces 26 and 28. Shaft 56 carries a crosspin 60, the ends of which are adapted to ride up the respective cam surfaces 26 and 28 and into notches 30 and 32 in a manner to be described hereinafter. For ease in assembly of my fastener, I provide the opening 58 with a pair of oppositely extending slots 62 which permit the crosspin 60 to be passed through the top of the base 24. Respective rivets 64 and 66 secure pin retainers 68 and 70 to arm 40 and to latch 38. After the crosspin 60 has been passed through the top of base 24, I bend the upper ends of the retainers 68 and 70 into slots 62 to prevent shaft 56 from becoming separated from base 24 under the action of spring 52.

I provide the end of shaft 56 remote from pin 60 with any suitable means such for example, as a knurled knob 72 adapted to be actuated to rotate shaft 56. It will be apparent that spring 52 bears between a hub 74 on knob 72 and the base of the housing 50. Owing to this action, the ends of pin 60 are resiliently urged into engagement with cam surfaces 26 and 28 and notches 30 and 32. I provide the plate 42 with an upstanding stop 76 adapted to be engaged by the latch 38 in the released position of the fastener and adapted to be engaged by the arm 40 in the latching position of the fastener. A boss 78 formed in the plate 42 momentarily restrains latch 38 against rotation from its latching position when the fastener is being released in a manner to be described hereinafter. Housing 50 is formed with an internal annular shoulder 80 which limits the movement of hub 74 inwardly of the door 14 to prevent the ends of cross pin 60 from riding over stops 34 and 36.

It is to be understood that while I have shown and described actuator shaft 56 as having a knurled knob 72 to operate the shaft, I could as well provide any other suitable actuating means. For example, the end of shaft 56 remote from pin 60, could be formed with a screw head adapted to be operated by a screw driver. Further, it will be appreciated that rather than providing retainers 68 and 70 for holding shaft 56 in assembled position with the base 24, I could so form the base that the slots 62 were filled thus to retain the shaft in position. Alternatively, I might form retainers 68 and 70 as leaf springs to facilitate assembly of the fastener.

In operation of my readily releasable fastener with the fastener in its unlatched position with latch 38 in engagement with stop 76 and with the ends of pin 60 resting on retainers 68 and 70 door 14 can be assembled in the opening 12 by slipping keeper flange 18 over the portion of the body 10 forming the lower edge of the opening. With the door 14 held firmly in engagement with the rabbet 16 the knob 72 then is rotated in a clockwise direction as viewed in FIGURE 1 or a counterclockwise direction as viewed in FIGURE 4. It will be appreciated that as the latch 38 is moved toward its latching position a boss 78 on plate 42 lifts the latch slightly so as to prevent the latch from striking the edge of the opening 12. When this is done, the ends of pin 60 engage the lower portions of the cam surfaces 26 and 28 and the latch 38 and arm 40 move with the shaft until arm 40 engages stop 76. In the course of this operation, latch 38 rides over boss 78 to a position at which it engages the inner surface of the body 10. When now the shaft is rotated further the arm 40 and the latch 38 are restrained against movement and the ends of pin 60 ride up cam surfaces 26 and 28 against the action of spring 52 until they snap into the recesses 30 and 32. It is to be noted that in the course of this action spring 52 draws latch 38 into secure engagement with the inner surface of body 10. Any attempt to rotate the shaft further merely results in the engagement of hub 74 with annular shoulder 80 formed on housing 50. Owing to this fact and to the presence of stops 34 and 36, further rotation of shaft 56 is prevented.

When it is desired to release the fastener knob 72 is rotated in a counter clockwise direction as viewed in FIGURE 1 to move shaft 56 in a clockwise direction as viewed in FIGURE 4. Initially, latch 38 and stop 40 tend to move with the shaft. However, owing to the fact that spring 52 is now urging the latch 38 toward the inner surface of body 10, as it starts to move latch 58 engages boss 78. Upon further rotation of shaft 56, the ends of pin 60 move out of notches 30 and 32 and ride down cam surfaces 26 and 28 until they rest on retainers 68 and 70. It will be appreciated that at this time latch 38 is free to move slightly away from the door 14 so that as shaft 56 rotates further, owing to the engagement of the ends of pin 60 with the portions of stops 34 and 36 remote from the notches, latch 38 and arm 40 move in a clockwise direction as viewed in FIGURE 4 with the latch 38 riding over boss 78 until it engages stop 76 at which point the door 14 can be removed from the opening.

It will be seen that I have accomplished the objects of my invention. I have provided a readily releasable fastener for holding a door in position over an access opening. My fastener overcomes the defects of fasteners of the prior art. It can be moved to locking or released position in a simple and expeditious manner. It cannot be excessively tightened. My fastener does not require the provision of any external indicator showing the position of the latch.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A readily releasable fastener for holding a first member in assembled relationship with a second member having an opening formed therein including in combination a receptacle having a base disposed on one side of said opening, means forming a cam surface rising from said base and a pin receiving notch at the top of said cam surface, a shaft extending through said opening and through said base, a pin carried by said shaft and adapted to engage said cam surface, a spring biased between said shaft and said second member on the other side of said opening to urge said pin into engagement with said cam surface, a latch carried by said base for movement therewith from a released position to a latching position in response to initial engagement of said pin with said receptacle upon rotation of said shaft, means for actuating said shaft to move said latch from its released position to its latching position, a stop for arresting said latch in its latching position, said pin being arranged to ride up said cam surface against the action of said spring and into said notch upon further movement of said shaft after said stop arrests said latch, said spring drawing such latch into resilient engagement with said first member upon said further movement of said shaft, said pin being adapted to be moved out of said notch upon reverse rotation of said shaft.

2. A readily releasable fastener for holding a pair of members in assembled relationship including in combination a latch carried by one of said members for movement around an axis between a released position and a latching position at which it is adapted to engage the other of said members, interengageable stop means operable to locate said latch in its latching position, a shaft carried by said one member, means responsive to rotary displacement of said shaft in one direction to move said latch to latching position and to engage said stop means, releasable detent locking means comprising a spring biased between said shaft and said one member in the direction of said axis to urge said latch toward said support, said detent locking means responsive to further rotary displacement of said shaft in said one direction after engagement of said stop means for drawing said latch into engagement with said other member, and means for restraining movement of said latch from said latching position to said released position whereby said releasable means is released upon initial rotary displacement of said shaft in a direction opposite to said one direction and said latch is moved to released position upon further rotation of said shaft in said opposite direction.

3. A readily releasable fastener for holding a pair of members one of which has an opening therein in assembled relationship including in combination a latch carried by said one of said members on one side thereof for movement between a released position and a latching position at which it is adapted to engage the other of said members, interengageable stop means operable to locate said latch in its latching position, a shaft carried by said one member and extending through said opening, means responsive to rotary displacement of said shaft in one direction to move said latch to latching position and to engage said stop means, releasable means comprising a spring biased between said shaft and the other side of said one member to urge said latch toward said support, said releasable means responsive to further rotary displacement of said shaft in said one direction after engagement of said stop means for drawing said latch into engagement with said other member, and means for preventing further rotary displacement of said shaft in said one direction following the operation of said latch drawing means.

References Cited by the Examiner

UNITED STATES PATENTS

| | | | |
|---|---|---|---|
| 2,269,264 | 1/42 | Haim | 292—212 X |
| 3,023,041 | 2/62 | Pluylaar | 292—212 |

FOREIGN PATENTS

| | | |
|---|---|---|
| 290,823 | 5/53 | Switzerland. |

M. HENSON WOOD, Jr., *Primary Examiner.*

ALBERT H. KAMPE, *Examiner.*